United States Patent [19]

Hildebrand et al.

[11] 4,338,093

[45] Jul. 6, 1982

[54] PROCESS FOR DYEING WITH REACTIVE DYESTUFFS

[75] Inventors: Dietrich Hildebrand, Odenthal; Wolfgang Lohnert, Leichlingen, both of Fed. Rep. of Germany

[73] Assignee: Bayer Aktiengesellschaft, Leverkusen, Fed. Rep. of Germany

[21] Appl. No.: 279,375

[22] Filed: Jul. 1, 1981

[30] Foreign Application Priority Data

Jul. 21, 1980 [DE] Fed. Rep. of Germany ....... 3027546

[51] Int. Cl.³ .......................... C09B 62/00; D06P 3/66
[52] U.S. Cl. .......................................... 8/549; 8/532; 8/638; 8/918
[58] Field of Search ........................... 8/549, 638, 532

[56] References Cited

U.S. PATENT DOCUMENTS

| 3,837,802 | 9/1974 | Litzler et al. | 8/549 |
| 4,078,884 | 3/1978 | Opitz et al. | 8/549 |
| 4,264,321 | 4/1981 | von der Eltz | 8/638 |
| 4,283,193 | 8/1981 | Hildebrand | 8/400 |

FOREIGN PATENT DOCUMENTS 1514152 6/1978 United Kingdom .
1530104 10/1978 United Kingdom .

OTHER PUBLICATIONS

Hildebrand; D., "Reactive Dyes: Application and Properties," in Venkataraman's, The Chemistry of Synthetic Dyes, vol. VI, (Academic Press) 1972, pp. 346–359.

*Primary Examiner*—A. Lionel Clingman
*Attorney, Agent, or Firm*—Sprung, Horn, Kramer & Woods

[57] ABSTRACT

The present invention relates to a new process for dyeing cellulose fibres and fibre mixtures containing cellulose fibres, which is characterized in that at least two different reactive dyestuffs which give dyeings of the same color shade on cellulose and which have reactivities which differ from each other by a factor of at least 10, are used in the same dyebath.

10 Claims, No Drawings

PROCESS FOR DYEING WITH REACTIVE DYESTUFFS

The present invention relates to a new process for dyeing cellulose fibres and fibre mixtures containing cellulose fibres, which is characterised in that at least two different reactive dyestuffs which give dyeings of the same colour shade on cellulose and which have reactivities which differ from each other by a factor of at least 10, are used in the same dyebath.

A difference in the reactivity of a factor of 10 corresponds to a difference in the hydrolysis constant at pH 11 (40°) of a power of ten, or a difference in the optimum dyeing temperature of 20°. (In this context, see: D. Hildebrand in Venkataraman: The Chemistry of Synthetic Dyes Volume VI, Academic Press, Inc., New York 1972, page 352).

Possible reactive dyestuffs which are to be used according to the invention are, preferably, dyestuffs of the azo, azo-metal complex, anthraquinone, oxazine, formazane and phthalocyanine series which contain sulpho groups and have at least one dichlorotriazinyl, dichloroquinoxalinyl, monofluorotriazinyl, difluoropyrimidinyl, monofluoropyrimidinyl, sulphoethylsulphonyl, monochlorotriazinyl or trichloropyrimidinyl group. A large number of these reactive dyestuffs mentioned have been described in the literature.

As already mentioned above, different reactive dyestuffs with reactivities which differ by a factor of at least 10 are employed in the process according to the invention.

The reactive dyestuffs to be combined are chosen in a simple manner, by determining the particular hydrolysis constant at pH 11 and 40° C. by physicochemical methods which are in themselves known. In this context, see: D. Hildebrand in Venkataraman "The Chemistry of Synthetic Dyes", Vol. VI, Academic Press, New York, page 348. The hydrolysis constants of the reactive dyestuffs employed in the dyeing process according to the invention must differ by a factor of at least 10. The optimum fixing temperatures of the reactive dyestuffs combined according to the invention preferably differ by at least 20° to about 40° C.

At least two dyestuffs of the same colour from in each case one of the ten combination series listed below are preferably combined in the process according to the invention, it being possible to vary the ratio of the individual dyestuff components in the mixture within wide limits, but ratios in the mixture of 1:4 to 4:1 being particularly suitable.

(1) Dichlorotriazinyl, monofluorotriazinyl and monochlorotriazinyl reactive dyestuffs;

(2) Dichlorotriazinyl, dichloroquinoxalinyl and monochlorotriazinyl reactive dyestuffs;

(3) Dichlorotriazinyl, monofluorotriazinyl and trichloropyrimidinyl reactive dyestuffs;

(4) Difluoropyrimidinyl, sulphatoethylsulphonyl and trichloropyrimidinyl reactive dyestuffs;

(5) Dichloroquinoxalinyl, sulphatoethylsulphonyl and trichloropyrimidinyl reactive dyestuffs;

(6) Monofluorotriazinyl, sulphatoethylsulphonyl and trichloropyrimidinyl reactive dyestuffs;

(7) Dichlorotriazinyl, monofluoropyrimidinyl and trichloropyrimidinyl reactive dyestuffs;

(8) Dichloroquinoxalinyl, monofluoropyrimidinyl and trichloropyrimidinyl reactive dyestuffs;

(9) Difluoropyrimidinyl, monofluoropyrimidinyl and trichloropyrimidinyl reactive dyestuffs;

(10) Monofluorotriazinyl, monofluoropyrimidinyl and trichloropyrimidinyl reactive dyestuffs.

Reactive dyestuffs which each have the same chromophoric radical are preferably combined.

The dyestuffs are used under the dyeing conditions customary in practice, in the presence of 5 to 150, preferably 50 to 100, grams of salt, such as, for example, sodium chloride or sodium sulphate, per liter of liquor solution at pH values of 8 to 13, in particular at pH 9 to 12, and at 20° to 130° C. Sources of alkali, such as sodium carbonate, sodium bicarbonate, sodium hydroxide solution and the alkali metal salts of phosphoric acid (for example $NaH_2PO_4$, $Na_2HPO_4$, $Na_3PO_4$ or mixtures thereof), are suitable for adjusting the pH value, and the pH value of the dyebath can be kept constant during the entire dyeing process or can be increased by stepwise addition of alkali.

The process is suitable for dyeing loose material, yarn, woven fabric and knitted fabric on the dyeing units known for the individual stages of processing, such as a package-dyeing apparatus, a yarn-dyeing apparatus, a winch vat, a jet-dyeing unit, a beam-dyeing apparatus or a jig.

The process gives dyeings which have a surprisingly improved levelness and an improved penetration and yield.

The use of dye liquors which have, in one colour, at least two reactive systems with fundamentally different optimum fixing properties has hitherto been known only for the case where the various reactive systems are attached to the same dyestuff radical. (In this context, see, for example, DE-OS (German Published Specification) No. 2,607,028 and DE-OS (German Published Specification) No. 2,603,670.

Dyestuffs which have the different reactive systems on the same dyestuff radical already exhibit an improved degree of fixing compared with dyestuffs which have only the one or the other reactive group, but their ease of washing out is also impaired and they exhibit no improvement in penetration, which means that the advantage associated with the increase in the degree of fixing is at least partly lost again. It has now been found, surprisingly, that, in the process according to the invention, matching shade mixtures of dyestuffs with reactive groups which are very different in reactivity also give, under the same dyeing conditions, higher fixing yields than the sum of those of the individual dyestuffs, in the same depth of colour and under the same dyeing conditions, without the ease of washing out being reduced.

The "parts" given in the following examples are in all cases parts by weight.

EXAMPLE 1

100 parts of knitted cotton fabric are treated, in a winch vat, with a dye liquor which consists of 3 parts of the dyestuff I (for the structure, see below), 3 parts of the dyestuff II (for the structure, see below), 25 parts of sodium carbonate, 100 parts of sodium sulphate and 1,869 parts of water.

The liquor is warmed from 20° to 80° C. in the course of 1 hour and is kept at this temperature for 1 hour. After customary rinsing and soaping, a deep red dyeing with good fastness properties is obtained.

[Structure I: naphthalene with SO3H-phenyl-N=N-, HO3S, SO3H, OH, NH-C(=O)-quinoxaline with two Cl]

[Structure II: naphthalene with SO3H-phenyl-N=N-, HO3S, SO3H, OH, NH-C(=N-)-triazine with Cl and NH2]

EXAMPLE 2

100 parts of a fibre mixture consisting of 50 parts of cotton and 50 parts of viscose staple are treated, in a package-dyeing apparatus, with a dye liquor which consists of 2 parts of the dyestuff I (for the structure, see below), 2 parts of the dyestuff II (for the structure, see below), 2 parts of the dyestuff III (for the structure, see below), 20 parts of sodium carbonate, 100 parts of sodium chloride and 1,874 parts of water.

The liquor is brought from 20° to 100° in the course of 80 minutes and kept at this temperature for 30 minutes. After customary rinsing and soaping, a level red dyeing with good fastness properties is obtained.

[Structure I: same as above]

[Structure II: same as above]

[Structure III: naphthalene with SO3H-phenyl-N=N-, HO3S, SO3H, OH, HN-triazine with two Cl]

EXAMPLE 3

100 parts of a woven fabric of a cotton/polyester fibre mixture consisting of 50 parts of cotton and 50 parts of polyester are treated, in a beam-dyeing apparatus, with a liquor which consists of 1.5 parts of the dyestuff III (for the structure, see below), 1.5 parts of the dyestuff IV (for the structure, see below), 2 parts of the dyestuff VII (for the structure, see below), 80 parts of sodium sulphate, 4 parts of trisodium phosphate, 1 part of monosodium phosphate and 910 parts of water.

The liquor is warmed from 20° to 130° C. in the course of 120 minutes and kept at this temperature for 30 minutes. A level red dyeing which has penetrated well and has good fastness properties is obtained.

[Structure III: same as above]

[Structure IV: naphthalene with SO3H-phenyl-N=N-, HO3S, SO3H, OH, HN-triazine with F and NH2]

[Structure VII: O2N-phenyl(CN)-N=N-phenyl-N(C2H4OCCH3(=O))2]

EXAMPLE 4

100 parts of a knitted mercerised cotton fabric are treated, in a jet-dyeing unit, with a liquor which consists of 1.5 parts of the dyestuff V (for the structure, see below), 1.5 parts of the dyestuff VI (for the structure, see below), 2.0 parts of monosodium phosphate, 100 parts of sodium sulphate and 900 parts of water.

The liquor is warmed from 20° to 60° in the course of 30 minutes and 2 parts of sodium hydroxide solution of 38° Bé strength in 6 parts of water are then added dropwise in the course of 2 hours, via the mixing vessel, from a stock tank provided with a metering device.

The dropwise addition is effected in a manner such that 1/5 of the dilute sodium hydroxide solution is added in the first hour and the remaining 4/5 of the dilute sodium hydroxide solution are added in the second hour. A deep red dyeing with good fastness properties is obtained.

[Structure V: naphthalene with SO3H-phenyl-N=N-, HO3S, SO3H, OH, HN-pyrimidine with Cl and two F]

[Structure VI: naphthalene with SO3H-phenyl-N=N-, HO3S, SO3H, OH, NH-pyrimidine with two Cl]

EXAMPLE 5

100 parts of a mixed yarn consisting of 50 parts of cotton and 50 parts of viscose staple are treated, in a yarn-dyeing apparatus, with 1,000 parts of a liquor which consists of 1.0 part of the dyestuff IX (for the structure, see below), 0.5 part of the dyestuff IX (for the structure, see below), 0.8 part of the dyestuff X (for the structure, see below), 0.4 part of the dyestuff XI (for the structure, see below), 1.3 parts of the dyestuff XII (for the structure, see below, 1.0 part of the dyestuff XIII (for the structure, see below), 15 parts of Na₂CO₃, 80 parts of sodium sulphate and 900 parts of water.

The liquor is warmed from 20° to 80° in the course of 60 minutes, and dyeing is carried out at this temperature for 1 hour. After customary rinsing and soaping, a level brown dyeing with good fastness properties is obtained.

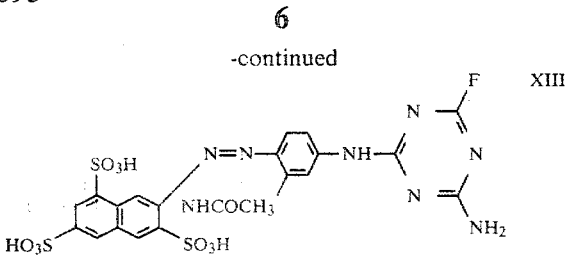

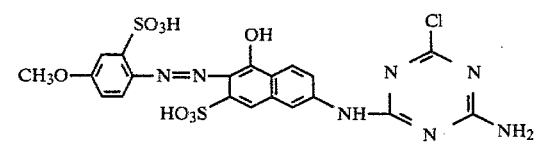

EXAMPLE 6

100 parts of a woven cotton fabric are impregnated with 70 parts of a padding liquor which consists of 30 parts of the dyestuff XIV, 30 parts of the dyestuff XV, 25 parts of sodium hydroxide solution with a specific density of 1.357 and 915 parts of water and are left to stand at 23° C. for 24 hours. After customary rinsing and soaping, a deep scarlet dyeing with good fastness properties is obtained.

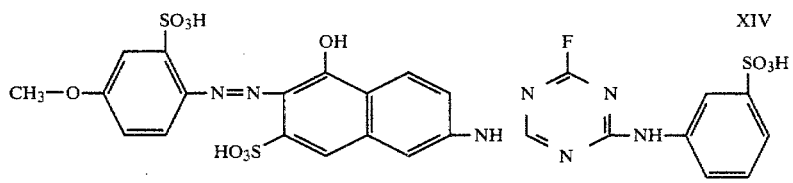

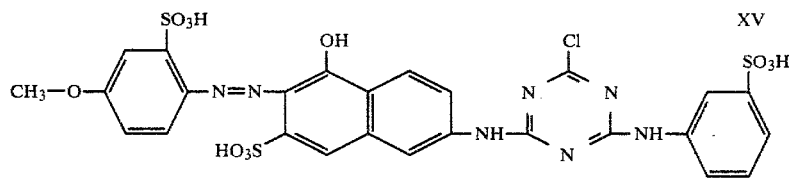

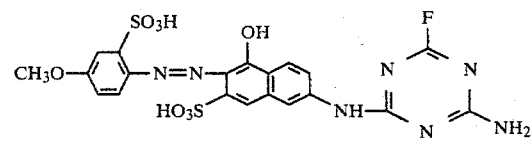

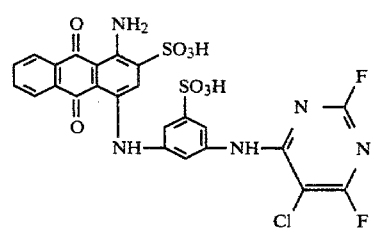

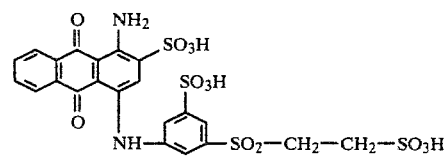

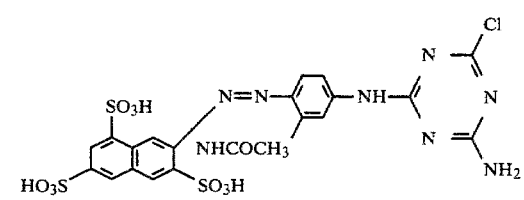

EXAMPLE 7

100 parts of a fibre mixture consisting of 50 parts of cotton and 50 parts of viscose staple are treated with 1,500 parts of a liquor, warmed to 30° C., which consists of 3 parts of the dyestuff XIV, 3 parts of the dyestuff XV, 2 parts of sodium carbonate, 3 parts of sodium hydroxide solution with a specific density of 1.357, 50 parts of sodium sulphate and 1,439 parts of water.

After treatment at 30° C. for 15 minutes, the liquor is warmed to 80° C. in the course of 60 minutes and dyeing is carried out at this temperature for 30 minutes. After customary rinsing and soaping, a level scarlet dyeing with good fastness properties is obtained.

We claim:

1. Process for dyeing cellulose fibres and fibre mixtures containing cellulose fibres, characterised in that at least two different reactive dyestuffs which give dyeings of the same colour shade on cellulose and which have reactivities which differ by a factor of at least 10 are employed.

2. Process according to claim 1, characterised in that at least two different reactive dyestuffs from one of the following combination series (1) to (10) are combined with one another:
   (1) a dichlorotriazinyl, a monofluorotriazinyl and a monochlorotriazinyl reactive dyestuff,
   (2) a dichlorotriazinyl, a dichloroquinoxalinyl and a monochlorotriazinyl reactive dyestuff,
   (3) a dichlorotriazinyl, a monofluorotriazinyl and a chloropyrimidinyl reactive dyestuff, (4) a difluoropyrimidinyl, a sulphatoethylsulphonyl and a trichloropyrimidinyl reactive dyestuff,
(5) a dichloroquinoxalinyl, a sulphatoethylsulphonyl and a trichloropyrimidinyl reactive dyestuff,
(6) a monofluorotriazinyl, a sulphatoethylsulphonyl and a trichloropyrimidinyl reactive dyestuff,
(7) a dichlorotriazinyl, a monofluoropyrimidinyl and a trichloropyrimidinyl reactive dyestuff,
(8) a dichloroquinoxalinyl, a monofluoropyrimidinyl and a trichloropyrimidinyl reactive dyestuff,
(9) a difluoropyrimidinyl, a monofluoropyrimidinyl and a trichloropyrimidinyl reactive dyestuff or
(10) a monofluorotriazinyl, a monofluoropyrimidinyl and a trichloropyrimidinyl reactive dyestuff.

3. Process according to claim 1 or 2, characterised in that reactive dyestuffs of which the optimum fixing temperatures differ by at least 20° to 40° are used.

4. Process according to claims 1 or 2 characterised in that reactive dyestuffs which have optimum fixing characteristics in the pH range from 8 to 13 are used.

5. Process according to claims 1 or 2, characterised in that reactive dyestuffs which have optimum fixing characteristics in the pH range from 9 to 12 are used.

6. Process according to claims 1 or 2, characterised in that reactive dyestuffs which carry the same chromophore are used.

7. Process according to claims 1 or 2 characterised in that reactive dyestuff mixtures in which, of each colour, at least two dyestuffs with reactive groups of different reactivity are present.

8. Process according to claims 1 or 2, characterised in that the ratios of reactive dyestuffs of the same colour and different reactivity in the mixture are 1:4 to 4:1.

9. Process according to claims 1 or 2, characterised in that the dyeing is carried out in the temperature range from 20° to 130° C.

10. Textile material which consists of cellulose fibres or fibre mixtures containing cellulose fibres and which has been dyed according to the process of claims 1 or 2.

* * * * *